March 5, 1957 O. J. MARTINSON 2,783,847
SHOE TRANSLATING MECHANISM FOR WALKING VEHICLES
Filed May 5, 1955 5 Sheets-Sheet 1
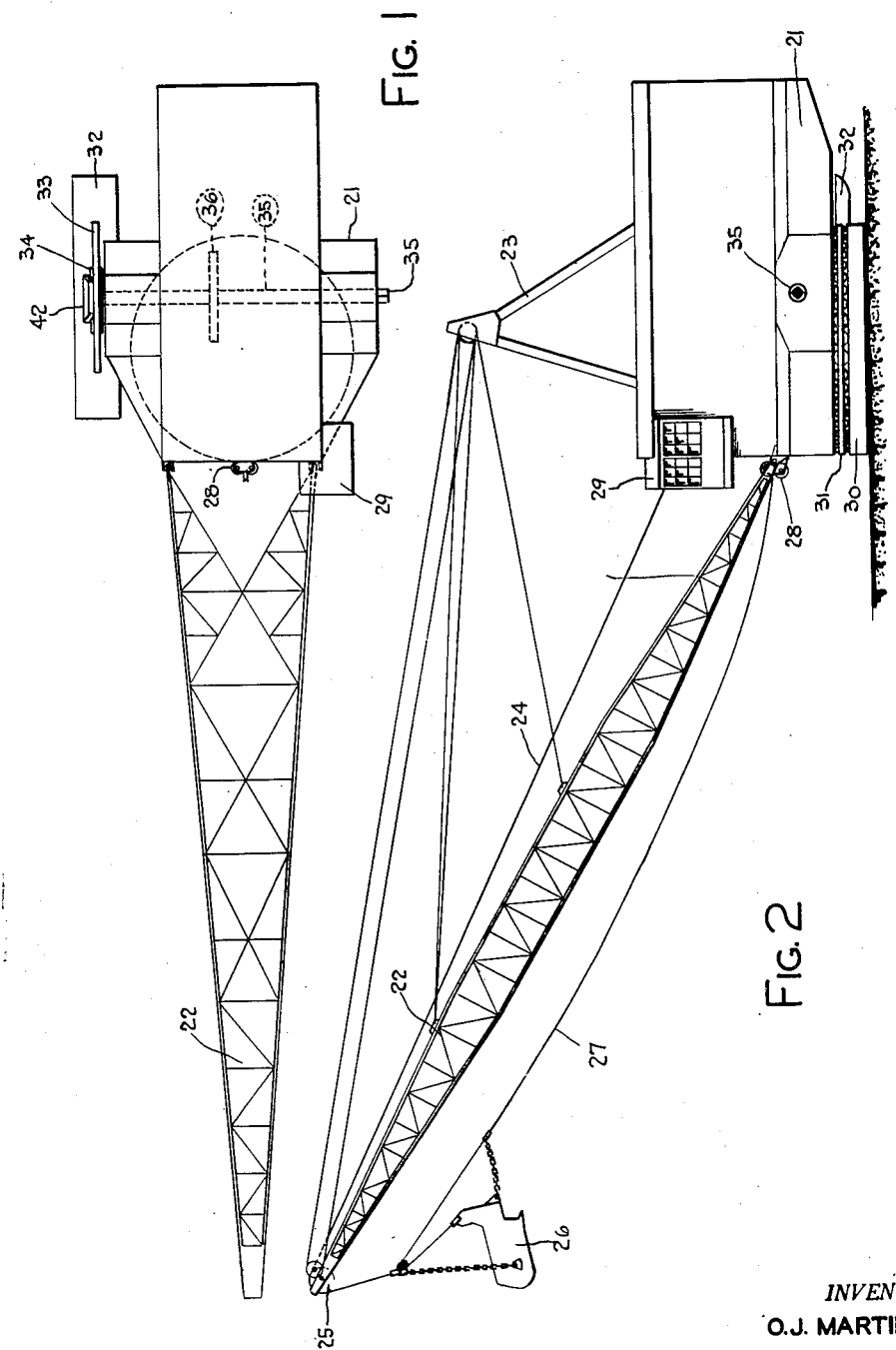
INVENTOR,
O.J. MARTINSON
BY
ATTORNEY March 5, 1957 O. J. MARTINSON 2,783,847
SHOE TRANSLATING MECHANISM FOR WALKING VEHICLES
Filed May 5, 1955 5 Sheets-Sheet 3

INVENTOR,
O. J. MARTINSON
BY
ATTORNEY

March 5, 1957  O. J. MARTINSON  2,783,847
SHOE TRANSLATING MECHANISM FOR WALKING VEHICLES
Filed May 5, 1955  5 Sheets-Sheet 4

*INVENTOR.*
O. J. MARTINSON
BY John Adams Thiery
ATTORNEY

March 5, 1957 O. J. MARTINSON 2,783,847
SHOE TRANSLATING MECHANISM FOR WALKING VEHICLES
Filed May 5, 1955 5 Sheets-Sheet 5

INVENTOR,
O. J. MARTINSON
BY
ATTORNEY

United States Patent Office 2,783,847
Patented Mar. 5, 1957

2,783,847

SHOE TRANSLATING MECHANISM FOR WALKING VEHICLES

Oscar J. Martinson, River Forest, Ill., assignor to Bucyrus-Erie Company, South Milwaukee, Wis., a corporation of Delaware Application May 5, 1955, Serial No. 506,345

13 Claims. (Cl. 180—8)

This invention relates to a traction mechanism, of the sort usually employed on that variety of excavator known as a "walking dragline," for example that shown and described in U. S. Patent No. 1,591,764, issued to the present inventor.

In such a device, the mechanism used for propelling the excavator includes two flanged wheels, each of which runs on a closed trackway, which extends around the periphery of an elongated hole in a track-frame. The upper and lower portions of this trackway are horizontal parallel straight lines; the ends are semi-circles. Each track-frame alternately suspends, and rests upon, a walking shoe. The wheels are rigidly mounted eccentrically, on opposite ends of a transverse driving shaft; and each wheel carries, diametrically opposite the place of attachment of the shaft, a laterally-projecting pin which slides in a substantially vertical slot, integral with the track-frame.

The main frame of the excavator rests upon a base in the form of a cylindrical plinth, located between the shoes, around the center of which base the main frame can revolve when the shoes are lifted off the ground.

By virtue of this arrangement, the wheels are constrained to move around their trackways, successively raising the shoes off the ground, moving them rearwardly, placing them on the ground again, lifting and tilting the main frame (the center of gravity of which is forward of the wheel-shaft) so that only the front edge of its base remains in contact with the ground, then sliding the base along the ground, and finally setting it down level again.

Inasmuch as that end of the main frame which carries the excavating equipment is commonly referred to as the front of the machine; and as the walking movements are in the direction of the other end of the machine, the words "forward" and "rearward" and similar words of direction, will be used herein with the understanding that the machine moves rearwardly.

Unfortunately this mechanism, as built in the prior art, compels the wheels to slip on their tracks during all but a negligible portion of their travel thereon; and this slippage has been found to consume a large part of the work done by the engine during propulsion.

Accordingly, it is the principal objct of the present invention to modify the walking device of the prior art in such manner that practically none of the work is wasted in slippage. To phrase this object in another way, it is to modify the walking device of the prior art in such manner that longer steps can be taken without any increase in the work per step.

A further object is to eliminate unstable equilibrium, which might otherwise occur at two positions in the cycle of the present invention.

A still further object is to provide means to prevent the shoes from digging into the ground when they are moved backward.

In addition to the objects above stated, there have been worked out a number of novel and useful details, which will be readily evident as the description progresses.

The present invention consists in the novel parts and in the combination and arrangement thereof, which are defined in the appended claims, and of which one embodiment is exemplified in the accompanying drawings, which are hereinafter described and explained.

Throughout the description the same reference number is applied to the same member or to similar members.

Figure 1 is a plan view of an excavator equipped with the walking device which is the subject-matter of the present invention. The shoe and accompanying mechanism on the left side (i. e., the side shown toward the bottom of the drawing) have been removed, showing only the projecting end of the transverse driving-shaft.

Figure 2 is a side elevation of the same excavator, as viewed from this left side.

Figures 7 to 11 inclusive show, largely diagrammatically, a side elevation of the machine, to illustrate five successive relative positions of the main frame and its base, and one shoe and its operating parts, in the course of one walking step.

Figure 12:
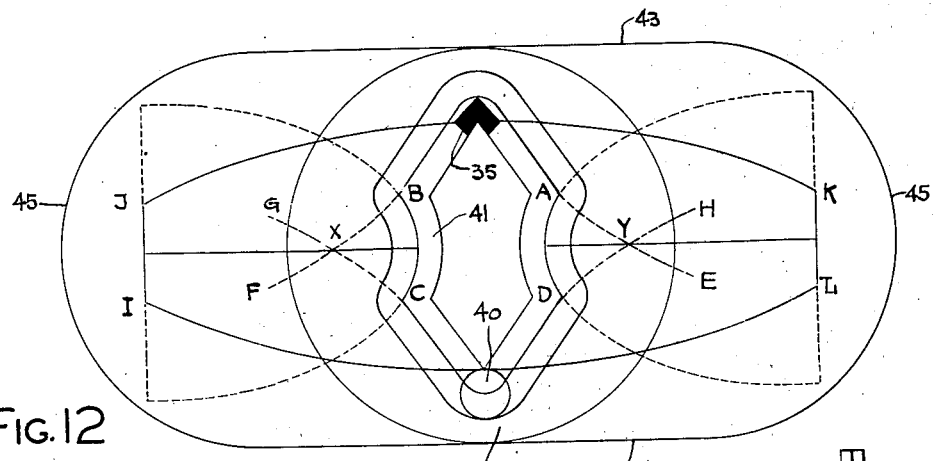

Figure 12 is a chart, illustrative of the mathematics underlying the optimum construction of the slot which guides the pin on the eccentric wheel of the invention.

Figure 13:
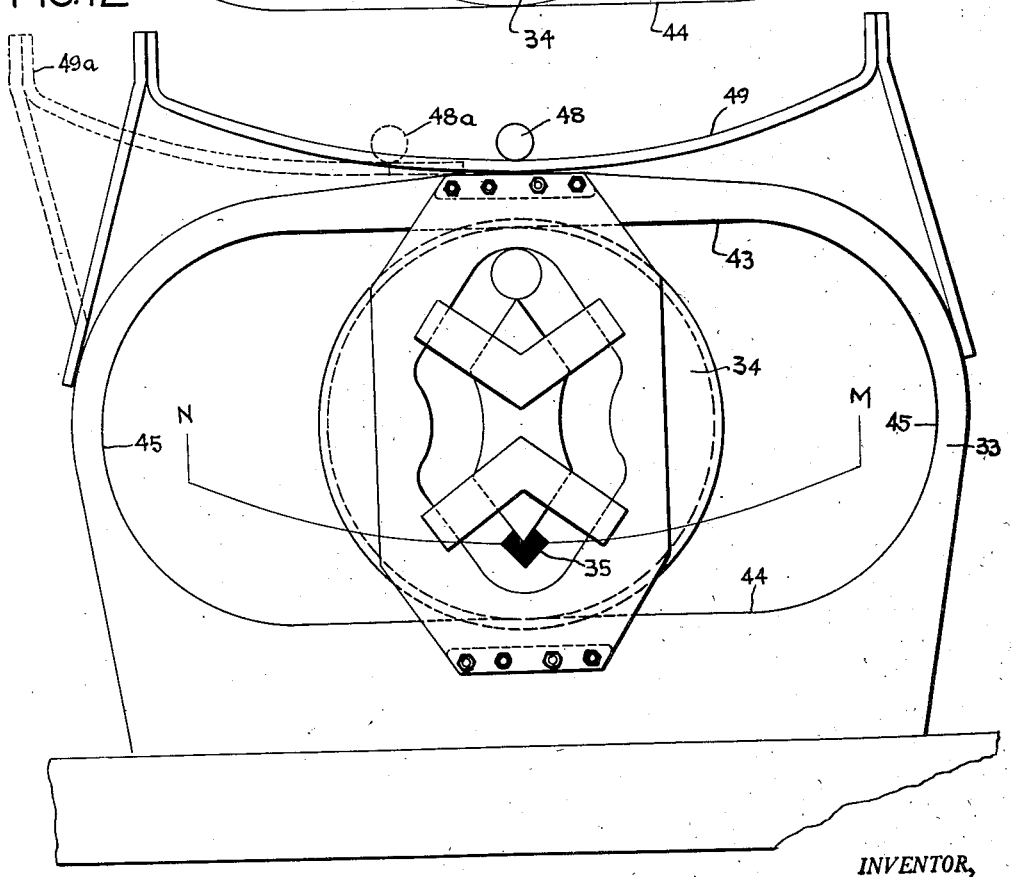

Figure 13 is an enlarged elevation of one wheel and its track-frame, with the addition of a camway on top of the track-frame, and a cooperating roller on the side of the main frame, for the purpose of preventing the shoe from digging-in.

Referring now particularly to Figures 1 and 2, we see that 21 is the main frame of an excavator which embodies the present invention. Projecting forwardly (i. e., to the left in the drawing) is a boom 22 suspended by guy-ropes from the top of an A-frame 23 on the main frame. A hoist rope 24 extends, from winch mechanism (not shown) on the main frame, over a sheave 25 at the outer end of boom 22 to support a drag-bucket 26 which is controlled by a drag-rope 27 which extends through a fairlead 28 on the main frame to the winch mechanism. 29 represents the operator's station.

Base 30 is in the form of a hollow cylindrical plinth, and serves to support main frame 21 through a series of rollers 31. On each side of the main frame is a shoe 32, alternately suspended from and supporting, a track-frame 33. In this track-frame there is a longitudinal hole 39 (not shown in Figures 1 and 2 but shown in Figure 3), on the periphery of which rolls a flanged wheel 34, which is eccentrically rotatably mounted on the end of a transverse shaft 35, journalled in the main frame and driven through a gear 36 by driving machinery (not shown). In Figures 1 and 2 the left-hand mechanism just described has been removed, showing merely the projecting square end of shaft 35.

Figure 3:
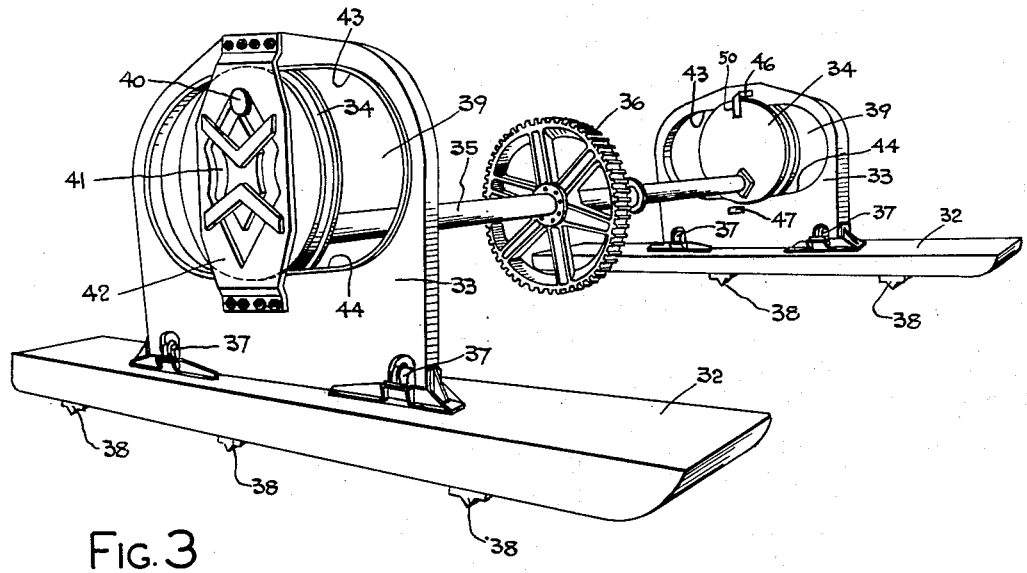
Figure 3 is a diagonal perspective of the two shoes, the two track-frames, the two eccentric wheels, the transverse driving-shaft, and the driving-gear on said shaft.

Figure 3 shows, in perspective, the two shoes 32, the two track-frames 33, the two flanged wheels 34, transverse shaft 35, driving gear 36, hinge mountings 37 which connect the shoes to their respective track-frames, and grousers 38 on the undersides of the shoes. There can also be seen the holes 39, in the track-frames 33, in which holes the wheels 34 roll. On the nearer wheel can be seen a laterally-projecting pin 40, preferably in the form of a freely-rotatable roller, which rolls in slot 41 in bridge 42, which latter is carried rigidly on the outer side of track-frame 33.

Figure 5:
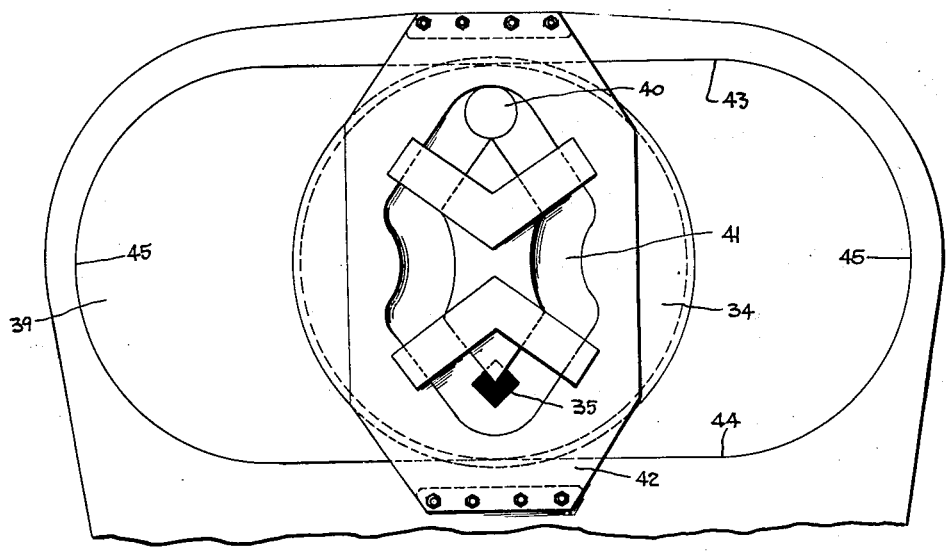
Figure 5 is this same combination as seen from the outside, looking toward the machine.

Turning now to Figure 5, to get a better view of the wheel-and-track-frame mechanism, it should be noted that the periphery of hole 39 constitutes a trackway for flanged wheel 34, this trackway consisting of an upper track 43 on which wheel 34 rolls when this wheel (suspended from the main frame) is suspending the track-frame, and a lower track 44 on which this wheel rolls when the wheel (supported by the track-frame) is supporting the main frame, and two end portions 45, which serve merely to close the two ends of the hole. As shown, these two end portions are semi-circular, which is a convenient but nonessential shape. The two tracks are slightly farther apart than the effective diameter of the wheel.

Figure 5 is considered as representing the left-hand mechanism, in which the relative motion of wheel 34 with respect to the track-frame 33 is clockwise rotation, rolling alternately from right to left on upper track 43, and from left to right on lower track 44. Meanwhile pin 40 moves counterclockwise in slot 41.

Figures 7 to 11 inclusive show, largely diagrammatically, the five successive relative positions of the machine in the course of one walking step.

It will be noted that, in all five figures, shaft 35, being journalled in main frame 21, occupies the same position relative to that frame.

Figure 7:
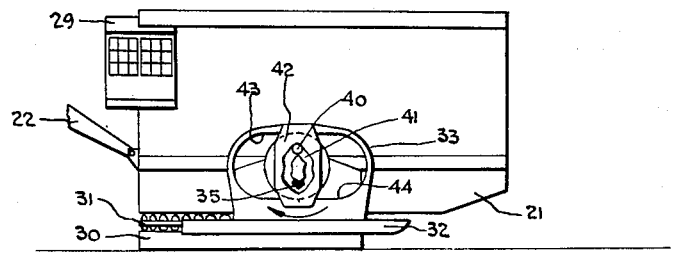

In Figure 7 pin 40 is in its highest position with respect to the ground. Accordingly wheel 34, bearing on upper track 43, has raised track-frame 33; and hence shoe 32 is in its highest position off the ground.

With the shoes in this position, main frame 21 is free to rotate about the center of base 30, so as to point the rear end of the main frame in any direction in which it is desired to travel.

Figure 8:
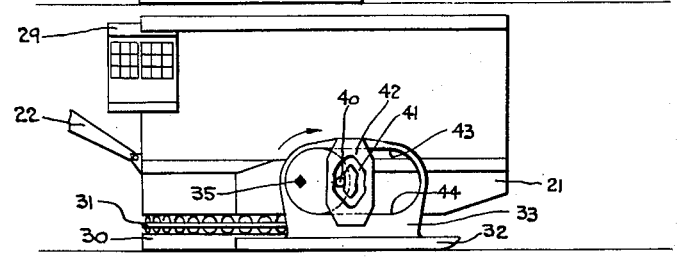
Figure 9:
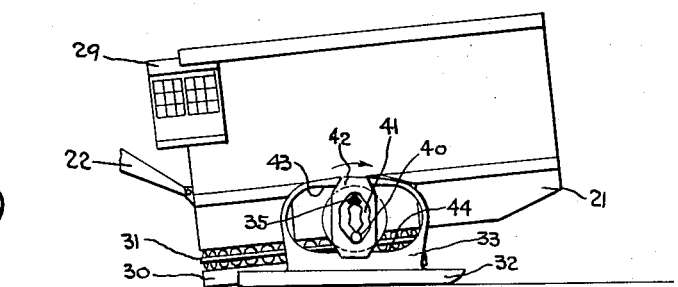

This having been accomplished, shaft 35 is started rotating clockwise, and wheel 34 turns clockwise about this shaft, rolls clockwise on upper track 43, and carries track-frame 33, and hence shoe 32, to the right and then down onto the ground in the position shown in Figure 8.

Continued clockwise rotation of wheel 34 presses pin 40 downward in slot 41, thus raising shaft 35 and carrying this shaft to the right as wheel 34 rolls clockwise on lower track 44.

This motion of shaft 35 lifts main frame 21. Due to the overbalancing effect of boom 22, main frame 21 tips, leaving the front edge of base 30 still in contact with the ground, and then drags the base rearwardly along the ground to the position shown in Figure 9.

Figure 10:
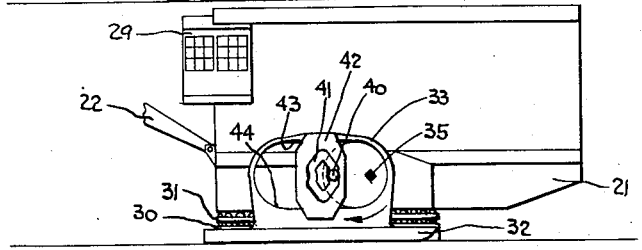

Further rolling of wheel 34 on lower track 44, carries the main frame and base still further to the right, and lowers it to the ground to the position shown in Figure 10.

Figure 11:
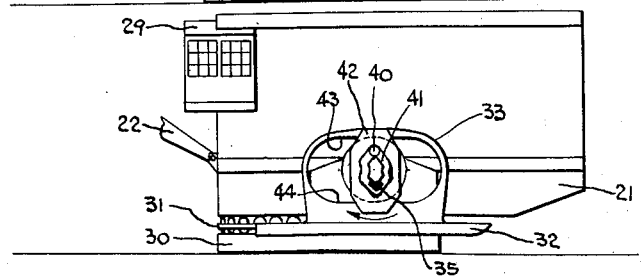

Wheel 34 then bears against upper track 43 and, rolling clockwise thereon, lifts track-frame 33 and shoe 32 to the position shown in Figure 11.

This completes the step. Everything is now in the same relative position as in Figure 7, except that the machine has been moved a considerable distance to the right.

Figure 6:
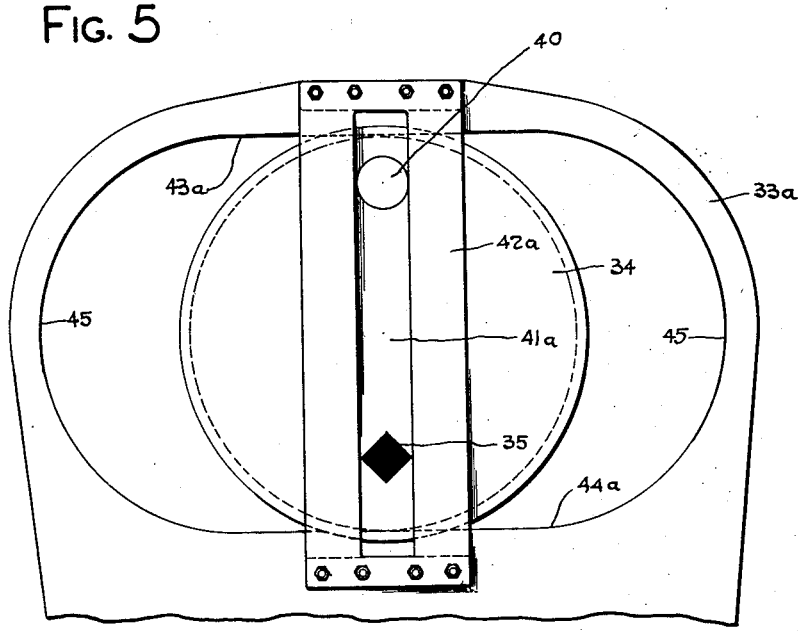
Figure 6 is the same view of this combination as it existed in the prior art.

In order to understand the essential differences between machines of the prior art and machines involving the present invention, the corresponding device of the prior art is portrayed in Figure 6. Wheel 34, shaft 35, and pin 40 are identical to those of the present invention, but slot 41a in bridge 42a, instead of having its center-line in the form of a closed curve, traversed by pin 40, has as its center-line a vertical line along which pin 40 moves up and down. As a result of this, upper track 43a and lower track 44a are much shorter than tracks 43 and 44, and wheel 34 slides (rather than rolls) in its motion along tracks 43a and 44a.

There will now be described the considerations involved in devising the optimum shape for slot 41 of the present invention. See Figure 12.

It has been ascertained that the major portion of the waste of energy consumed in slippage in the prior-art device of Figure 6, occurs while wheels 34 are moving rearwardly on lower tracks 44 while lifting main frame 21 and pulling it backwards along the ground, and that nearly all the rest of such waste energy occurs while wheels 34 are moving forwardly on upper tracks 43 while lifting the shoes, shifting them backwards, and lowering them.

Accordingly, to eliminate these wastes, the upper and lower portions (AB and CD) of the center line (ABCD) of slot 41 have been designed in the form of the cuspidal portion (i. e., that portion having the least radius of curvature) of prolate trochoids EABF and GCDH, with tracks 43 and 44 respectively as their bases (the cusps being centrally located along the respective track), with wheel 34 as their generating circle, and with the center of pin 40 as their carried point.

So long as pin 40 is guided by these portions of slot 41, wheel 34 will not slip on either track.

Inasmuch as cycloids are a limiting case of prolate trochoids, the term "prolate trochoid" when used herein is to be understood as generic to prolate trochoids and cycloids.

It will be noted that the two trochoids intersect at X and Y. However, if the slot were to extend to, and include, these points of intersection, there would be relative fore-and-aft movement of shoes 32 and base 30, while both were engaging the ground. And with pin 40 travelling along the lower trochoid, while at a short distance from either point of intersection, base 30 would not be tilted sufficiently to slide easily. All this would entail a greater waste of energy than is saved by the present invention in other parts of the walking cycle. Furthermore the corners at X and Y would involve very sharp turns for pin 40, subject to wear and breakage.

Accordingly there is provided a substantially vertical short-cut just short of each of these two points. In order that there may be no relative movement whatever of shoes 32 and base 30 while pin 40 is on this short-cut, it is requisite that the center of shaft 35 move upwardly or downwardly in a straight line while this transition from one track to the other is taking place.

Accordingly each short-cut (BC and DA) is so designed that its center-line is a portion (concave outwardly) of the small end of an ellipse, the major axis of which lies half way between the two tracks and parallel to them, and the minor axis of which lies on the vertical line along which it is desired that the center of shaft 35 should move during the transition period. The length of the major axis should be twice the distance from the center of shaft 35 to the center of pin 40. The length of the minor axis should be twice the distance from the center of wheel 34 to the center of pin 40.

With these short-cut portions (BC and DA) thus designed, the center of shaft 35 will move in the desired straight line (IJ and KL) during the transition of the wheel from rolling on one track to rolling on the other.

There will be slight, almost negligible, slippage of wheel on track during this transition, but this is unavoidable and is lesser than the alternative evil of having relative slippage of shoes and base on the ground.

The balance (LI and JK) of the path of the center of shaft 35 consists of the flat portions of two prolate trochoids different from the two trochoids discussed earlier herein. These two new trochoids have tracks 43 and 44 respectively as their bases, and wheel 34 as their generating circle, but the center of shaft 35 as their carried point. Note that the shaft 35 travels its path clockwise.

It has been demonstrated experimentally that this slot-design saves so much heretofore wasted energy, that the approximately 25% longer step taken by the present device requires no more work than the shorter step of the prior-art device.

Although ideally the center-line of slot 41 should be composed of the cuspidal portions of two certain prolate trochoids at the top and bottom, the sides being each the middle segment of the end portion of a certain ellipse, all as explained earlier herein, yet it will be seen from Figure 12 that the inner boundary of each trochoid portion is practically two straight lines meeting at approximately a right-angle, and that the elliptical portions depart very slightly from being short circular arcs. Even straight-line boundaries might be substituted for the elliptical portions, without very great waste of energy. Accordingly the ideal slot and its approximations may be generically termed a hexagon with two slightly-concave sides, or even merely a hexagon without specifying whether or not its sides are straight.

In fact, almost any arrangement in which the center-line of the slot is a closed curve would waste less energy than the conventional prior-art single vertical path in which the pin moves up and down.

It has already been noted earlier herein that, when wheel 34 is turning clockwise as it runs along first one and then the other of tracks 43 and 44, pin 40 is simultaneously running around through slot 41 counterclockwise. Also it should be noted that there are two critical points, or positions of almost unstable equilibrium, of pins 40 in slot 41, namely when the pin is at the extreme top and bottom points of the slot.

At each of these two points, were it not for the frictional engagement of wheel 34 on tracks 43 and 44, the pin would be in unstable equilibrium, that is to say, the pin would be just as likely to return the way in which it came, i. e., start going clockwise, as to continue to go counterclockwise.

It can readily be realized that if this happened on both sides of the machine simultaneously the machine would suddenly reverse its direction of walking; whereas, if it happened on only one side, the machinery would jam and probably be wrecked.

The frictional engagement of the wheels on their tracks is, however, enough to keep the pins moving in the proper direction, in the absence of counter-resistance.

In the case of a model, operating in a room with a smooth floor, there is no such counter-resistance to the forward movement of shoes 32 when raised; and so pins 34 should never reverse at the top of slots 41. There is so little resistance to base 30 sliding over the floor that there should seldom, if ever, be any reversal of the pins at the bottom of their slots.

In the case of a rear machine operating in the field, or of a model operating under field conditions, there is occasionally enough resistance to the forward movement of shoes 32 when raised, and/or to the downward movement of their front ends, as by hitting a stump or other elevated obstruction, to cause reverse movement of one or both of the pins at the top of the slot. And the normal resistance of the ground to the sliding of base 30 is frequently enough to cause reverse movement of one or both of the pins at the bottom of their slots.

This brings us to the second of the objects enumerated earlier herein, namely to eliminate the occurrence of unstable equilibrium at these two points.

Figure 4:
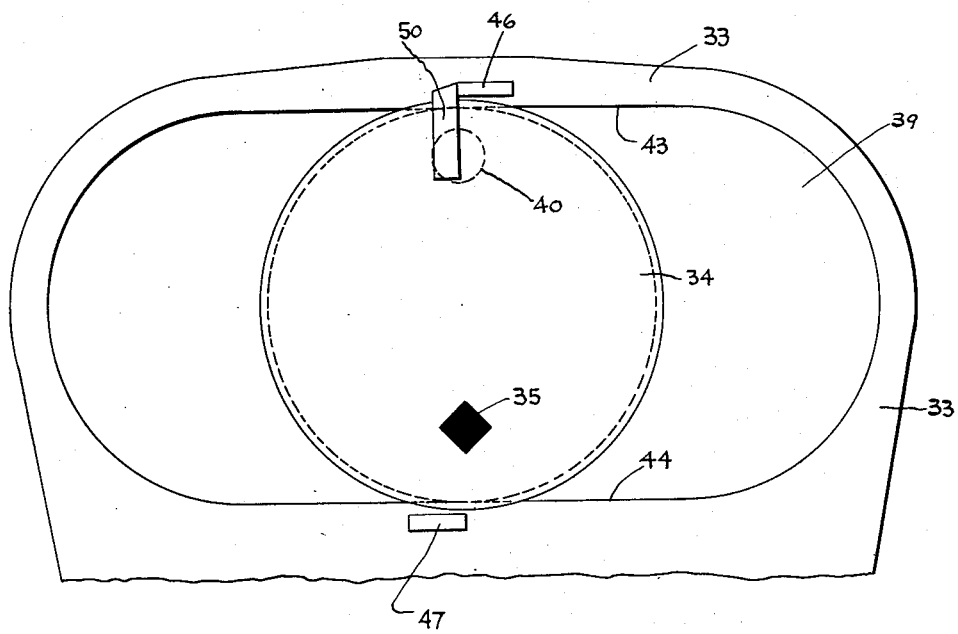
Figure 4 is an enlarged elevation of one wheel and its track-frame as seen looking out from the machine.

The mechanism for accomplishing this object is shown in Figure 4, which represents one wheel and its track-frame as seen looking out from the machine. As shown, wheel 34 is rolling clockwise along upper track 43, moving to the left thereon, and has reached the mid-point of this track. Pin 40 is at the top point of its slot 41 (not visible in this view). A tooth 50 projecting radially from wheel 34 has slid into engagement with stop 46 on the upper portion of track frame 33. Thus wheel 34 may be considered momentarily geared to track 43, and this gearing compels the wheel to continue rolling to the left, and thus prevents any back-tracking of pin 40 in its slot. A similar engagement between projecting tooth 50 and stop 47 on the lower portion of track-frame 33, prevents back-tracking of pin 40 when wheel 34 is rolling clockwise to the right on lower track 44 at the middle point thereof.

Thus these cooperating means on each wheel and its corresponding track-frame, for mutual engagement, cause the wheel to continue to roll past the mid-points on the two tracks, instead of being in danger of back-tracking at these points.

This brings us to the third of the objects enumerated earlier herein, namely to prevent the shoes from digging into the ground as they are moved backward. The mechanism for accomplishing this object is shown in Figure 13.

When wheel 34 is rolling clockwise on upper track 43 and moving to the left thereon, this is carrying track-frame 33 and shoes 32 from the position shown in Figure 10, through the position shown in Figures 11 and 7, to the position shown in Figure 8. In Figure 13, the elements are shown in the position of Figures 11 and 7.

Were it not for the feature about to be described, the left-hand end of shoe 32 would tilt downward when moving from the position of Figure 10 to the position of Figure 11, and the right-hand end of shoe 32 would tilt downward when moving from the position of Figure 7 to the position of Figure 8.

The following-described mechanism prevents this. In Figure 13 the line MN represents the path of the center of shaft 35 relative to track-frame 33 as wheel 34 rolls along track 43 from its extreme right-hand position to its extreme left-hand position. Roller 48 projects from the side of the main frame, and engages camway 49 secured rigidly to the top of track frame 33. The shape of this camway is such that the center of roller 48, when rolling on the camway, will describe a path directly congruent with, and oriented the same as, line MN. This results in the roller, as it runs along this camway, constraining the shoe to remain horizontal during the entire time that it is raised. The right-hand half of the camway performs this function while the shoe is being raised, and the left-hand portion of the camway performs this function while the shoe is being lowered. Thus the right-hand half is seen to be not so important as the left-hand half. If the right-hand half is omitted, a better leverage can be obtained by shifting the left-hand half, and the corresponding roller, to the left, to the dotted-line positions shown as 49a and 48a.

This mechanism, by holding the shoe horizontal, effectively prevents the point of the shoe from digging-in as the shoe is lowered. Other equivalent cooperating means on each track-frame and the corresponding side of the main frame, could be employed for mutual engagement to limit gravity tilting of the shoe when being moved rearwardly and lowered.

Now that one embodiment of the invention, and several minor variations of details thereof, have been described, it is to be understood that the invention is not limited to the specific form or arrangement of parts herein described and shown.

What is claimed is:

1. In a traction mechanism, the combination of: a ground-engaging base; a main frame mounted thereon; two wheels, lying in parallel vertical planes, one on each side of the main frame; transverse shaft means, eccentrically mounting the two wheels on the main frame, for rotation in unison; means for rotating the shaft means; two ground-engaging shoes, one on each side of the main frame; two apertured track-frames, lying in parallel vertical planes, one mounted on each shoe and extending upwardly therefrom, the upper and lower edges of the aperture of each track-frame constituting opposing wheel-engaging tracks; a guide-pin projecting laterally from the outer face of each wheel; a slotted bridge spanning each aperture, the center-line of the slot being in the form of a continuous closed curve, and the sides of the slot guidably engaging the corresponding guide-pin.

2. Traction mechanism, according to claim 1, characterized by the fact that the center-line of the slot is approximately a hexagon, one corner being upward, one corner downward, and the two opposite sides which do not adjoin these corners being approximately vertical.

3. Traction mechanism, according to claim 2, further characterized by the fact that the two approximately vertical sides of the hexagon are slightly concave.

4. Traction mechanism, according to claim 1, characterized by the fact that the center-line of the lower portion of the slot is approximately the cuspidal portion of a prolate trochoid, the generating circle of which is the wheel, the base of which is the lower track, and the carried point of which is the center of the pin, the cusp being centrally located with respect to the track; and that the center-line of the upper portion of the slot is approximately a trochoid symmetrical to the first trochoid, but with the upper track as its base.

5. Traction mechanism, according to claim 1, further characterized by the fact that the center-line of each side portion of the slot is one end of an ellipse, the major axis of which is equal in length to twice the distance from the center of the pin to the center of the shaft and lies parallel to the two tracks mid-way between them, and the minor axis of which is equal in length to twice the distance from the center of the wheel to the center of the shaft and lies on the line through the two positions occupied by the center of the shaft when the wheel is in its extreme position between the adjacent ends of the two tracks.

6. Traction mechanism, according to claim 1, characterized by having cooperating means on each wheel and the corresponding track-frame, for mutual engagement to cause the wheel to continue to roll past the mid-point on at least one of the two tracks, instead of back-tracking thereon at said point.

7. Traction mechanism, according to claim 6, further characterized by the fact that the cooperating means comprises a tooth adjacent the periphery of the wheel adjacent the pin, and cooperating tooth on the track-frame adjacent the center of one track.

8. Traction mechanism, according to claim 1, characterized by having cooperating means on each wheel and the corresponding track-frame, for mutual engagement to cause the wheel to continue to roll past the mid-point on each track, instead of back-tracking thereon at said point.

9. Traction mechanism, according to claim 8, further characterized by the fact that the cooperating means comprises a tooth adjacent the periphery of the wheel adjacent the pin, and two cooperating teeth on the track-frame, one of said latter teeth being adjacent the center of one track, and the other of said latter teeth being adjacent the center of the other track.

10. In a traction mechanism, the combination of: a ground-engaging base; a main frame mounted thereon; two wheels, lying in parallel vertical planes, one on each side of the main frame; transverse shaft means, eccentrically mounting the two wheels on the main frame, for rotation in unison; means for rotating the shaft means; two ground-engaging shoes, one on each side of the main frame; two apertured track-frames, lying in parallel vertical planes, one mounted on each shoe and extending upwardly therefrom, the upper and lower edges of the aperture of each track-frame constituting parallel wheel-engaging tracks slightly further apart than the effective diameter of the wheels; engaging means on the outer face of each wheel; guide means on each track-frame and defining for said engaging means a path of travel relative to said track frame in the form of a continuous closed curve, engaged by the corresponding engaging means, for constraining the corresponding wheel to roll successively on the upper and lower tracks of the corresponding track-frame, without material slippage with respect thereto.

11. Traction mechanism, according to claim 10, characterized by having cooperating means on each track-frame and the corresponding side of the main frame, for mutual engagement to limit the gravity-tilting of the shoe on that side when being moved rearwardly and lowered.

12. Traction mechanism according to claim 11, further characterized by the fact that the cooperating means comprise a camway carried by the track-frame, and a projection projecting laterally from the side of the main frame and engageable with the camway during at least that portion of the cycle during which the track-frame and the shoe carried thereby are being moved both rearwardly and downwardly.

13. Traction mechanism, according to claim 12, still further characterized by the fact that the projection is a roller for rolling on the camway, and that the roller is so positioned and the camway is so positioned and shaped, that the center of the roller when rolling on the camway will describe (relative to the track-frame) a path directly congruent to, and oriented the same as, the path described (relative to the track-frame) by the center of the shaft during the same period.

References Cited in the file of this patent
UNITED STATES PATENTS 1,591,764   Martinson _____ July 6, 1926